(12) United States Patent
Plasberg et al.

(10) Patent No.: US 7,863,780 B2
(45) Date of Patent: Jan. 4, 2011

(54) SAFETY SWITCHING DEVICE AND METHOD FOR MONITORING A HAZARDOUS AREA DEFINED BY MOTOR-DRIVEN COMPONENTS

(75) Inventors: Georg Plasberg, Bahlingen (DE); Heike Haarmann, Obersaasheim (FR); Matthias Elbert, Biederbach (DE); Martin Wuestefeld, Sexau (DE); Claus Melder, Au (DE)

(73) Assignee: SICK AG, Waldkirch (DE)

( * ) Notice: Subject to any disclaimer, the term of this patent is extended or adjusted under 35 U.S.C. 154(b) by 594 days.

(21) Appl. No.: 11/907,549

(22) Filed: Oct. 15, 2007

(65) Prior Publication Data

US 2008/0272903 A1 Nov. 6, 2008

(30) Foreign Application Priority Data

Oct. 18, 2006 (EP) .................................. 06021847

(51) Int. Cl.
*H02H 11/00* (2006.01)
(52) U.S. Cl. ..................................................... 307/326
(58) Field of Classification Search .................. 307/326
See application file for complete search history.

(56) References Cited

U.S. PATENT DOCUMENTS

| 3,950,755 | A | 4/1976 | Westbrook, Sr. |
| 6,753,776 | B2 * | 6/2004 | Drinkard .................... 340/540 |
| 6,897,783 | B2 * | 5/2005 | Zeng et al. .................. 340/635 |
| 2005/0190056 | A1 | 9/2005 | Lacy et al. |
| 2006/0279401 | A1 * | 12/2006 | Yoshii et al. ............... 340/5.61 |

FOREIGN PATENT DOCUMENTS

| DE | 44 10 009 A1 | 9/1995 |
| EP | 1 479 964 A2 | 11/2004 |
| FR | 2 810 650 | 12/2001 |

* cited by examiner

*Primary Examiner*—Jared J Fureman
*Assistant Examiner*—Dru M Parries
(74) *Attorney, Agent, or Firm*—The Nath Law Group; Jerald L. Meyer; Sungyeop Chung

(57) ABSTRACT

The disclosure relates to a safety switching device for a hazardous area defined by motor-driven components, the device being switchable into at least two control stages, wherein in a first control stage at least some of the motor-driven components can be switched into a state of reduced risk potential and in at least one second control stage at least some of the motor-driven components can be shut off, and wherein the safety switching device comprises an apparatus for determining the position of the safety switching device inside the hazardous area.

2 Claims, No Drawings

SAFETY SWITCHING DEVICE AND METHOD FOR MONITORING A HAZARDOUS AREA DEFINED BY MOTOR-DRIVEN COMPONENTS

The invention relates to a safety switching device and to a method for monitoring a hazardous area defined by motor-driven components.

Motor-driven components are used above all in automated systems, particularly such employing robots. In these, frequently the need to perform work in direct vicinity to the motor-driven components exists during the operation of the system or also for adjustment, start-up or maintenance work, so that persons must be present in the vicinity of the motor-driven components. Uncontrolled movements, particularly such performed by robots, however, represent a high risk potential for the corresponding persons. So as to prevent injuries to the persons, a region around the motor-driven components is defined by protective devices, such as fences, wherein this region is in principle subject to the risk of injury, which is to say a hazardous area. As soon as a person enters this area, for example by opening a door in the fence, all motor-driven components disposed inside the fence are shut off. The disadvantage, however, is that it is not possible to enable any type of cooperation between a person and a machine in operating state, since all components are completely shut off. In addition, this completely interrupts production, which can result in high losses. Furthermore, a start-up of all components disposed in the hazardous area is time-consuming and expensive.

In complex systems, therefore, the motor-driven components are divided into a variety of smaller manufacturing cells. This, however, requires a plurality of safety fences, which results in high costs. If a person enters a manufacturing cell, only the corresponding motor-driven components in this area are shut off. However, this may affect the adjoining regions. Furthermore, cooperation is still not possible between a user and a motor-driven component, particularly a robot. It still remains impossible during operation to enter the area and perform adjustment, start-up or maintenance work.

To be able to enter a hazardous area during operation, enabling switches are used. A safe two-stage or three-stage enabling switch triggers an enabling function in order to perform the automated processes inside the hazardous area with reduced risk potential in the depressed or semi-depressed position of the enabling switch, for example through reduced speeds of movement of the motor-driven components. Releasing, or in the case of a three-stage enabling switch also completely depressing the enabling switch, however, immediately stops the corresponding movement and thus cancels the confirmation of the movement. Such a three-stage enabling switch is disclosed, for example, in DE 199 09 968 A1. Only when the enabling switch is held in a certain position, which is to say as long as the corresponding person holds the button depressed, can a movement of the components inside the hazardous area be performed. If the person releases the button or if the person, for example while panicking, completely depresses the button of a three-stage enabling switch, all motor-driven components in the hazardous area are switched off. A wireless enabling switch is revealed, for example, in DE 103 44 359 A1 to ensure that a person can easily carry the enabling switch.

However, to be able to flexibly perform work inside a complex system with a plurality of motor-driven components, without excessively interfering with the operation of the system, the corresponding system must be broken down into a plurality of small, defined hazardous areas, such as manufacturing cells. This is not only associated with great expenses for protective devices, particularly for safety fences, it also requires that the individual small hazardous areas are individually equipped with access control functions and safety measures and are matched to one another.

To bypass these disadvantages and enable direct interaction between a user and a motor-driven component, particularly robots, DE 10 2005 003 827 A1, for example, proposes a device, wherein a person approaching a robot unit on a work station is monitored by means of at least two light barriers and the robot unit is switched from the automatic operating mode, to which the robot unit is set, to a specifiable state, referred to as the safe operation stop state, as long as no person is present inside a predefined region around the robot unit. This safe operation stop state is characterized in that the robot unit is switched to a kind of stand-by mode, in which the robot unit no longer performs any movements. Also with the help of this method it is therefore not possible to perform a direct cooperation between the user and the robot unit while the person is present in the direct vicinity of the robot unit.

DE 102 16 023 A1, for example, discloses a method for optically detecting and evaluating the dynamic movement of the person. DE 103 20 343 A1 on the other hand discloses a method, wherein a movement pattern is impressed on the robot unit, the pattern providing the person with a sense of safety. Both methods, however, require that persons can be undoubtedly detected in the space, wherein the sensors that are able to perform such detection and at the same time meet the high demands stipulated by the relevant safety standards, such as DIN EN 954 or IEC 61508, however are presently not available yet or are very expensive, wherein readiness for series production is not foreseeable.

It is therefore the object of the invention to provide a device, which enables a person to access a hazardous area with simple, but safe means, wherein the safety of the person must be guaranteed at all times and the expenses for securing the hazardous area should be minimized. Furthermore, it is another task of the invention to provide a method for monitoring a hazardous area defined by motor-driven components, wherein the method can be performed with low expenses, but satisfies common safety standards.

The object is achieved by a safety switching device with the characteristics of claim 1 and by a method for monitoring a hazardous area defined by motor-driven components with the characteristics of claim 2.

According to the invention, a safety switching device for a hazardous area defined by motor-driven components is proposed, the device being based on the principle of an enabling switch. The safety switching device can thus be put into at least two control stages, wherein in a first control stage at least some of the motor-driven components can be switched to a reduced risk potential state and in at least one second control stage at least some of the motor-driven components, preferably all motor-driven components disposed in the hazardous area, can be switched off. In principle, the reduced risk potential state can also mean that the corresponding components are completely stopped or even shut off. If a person having a safety switching device enters the hazardous area, the entering with the safety switching device in the first control stage switches the system to a reduced risk potential operating state. If, however, the actuating device is switched to the second position and thus the safety switching device is switched to the second control stage, at least some of the motor-driven components are switched off. The safety switching device according to the invention comprises an apparatus for determining the position of the safety switching device inside the hazardous area. As a result, the hazardous areas can be expanded again and, for example, may comprise an entire manufacturing system including all motor-driven components, wherein with the help of the position of the safety switching device the position of the user inside the hazardous area can be determined and thus the motor-driven components disposed in the vicinity of the safety switching device can be switched to a state of reduced risk potential. However, in order to minimize interference with the operation of the system, only the motor-driven components that are disposed in the vicinity of the safety switching device are switched to a state of reduced risk potential, which is to say for example the corresponding speed of motions of the motor-driven components is reduced, while the person can move freely about the hazardous area and the motor-driven components located in removed sections of the hazardous area maintain their normal operating state. To be able to determine which of the motor-driven components should be switched to a reduced risk potential state, for example, a minimum distance can be defined for every motor-driven component, wherein no person will be allowed to be present inside of this distance to allow the corresponding components to move at their normal operating speeds.

It is preferable, however, if a space is defined around the safety switching device, the space being at least large enough so that a user can be located therein, wherein, upon switching the safety switching device into the first control stage, the motor-driven components disposed inside the space defined around the safety switching device can be switched to a state of reduced risk potential. If a user carries a safety switching device while entering the hazardous area, it can thus be ensured that during the user's movements through the hazardous area in principle all motor-driven components disposed in his vicinity, which is to say in the space defined around the safety switching device, are switched to a state of reduced risk potential. The hazardous area can thus also be selected to be very large, wherein only one protective device, such as a safety fence, around the entire system is required, even if the system has a complex design, and only one access control function is required in the protective device, which the person must pass to enter the hazardous area. Extensive divisions into smaller hazardous areas using protective devices and complex individual access control functions to subdivided smaller hazardous areas are therefore redundant. The person can move around inside the defined hazardous area, however it is ensured that the person with all body parts and at all times is located inside a space in which the motor-driven components were switched to a state of reduced risk potential. This space may be, for example, spherical volume having a radius of 2 m, thus ensuring that a person is present with all body parts and at all times inside this space. The space, however, may also be selected considerably larger than the dimensions of a person in order to prevent that during an extremely rapid movement of the person through the hazardous area the components do not shut off promptly or are switched to the state of reduced risk potential before the person has reached the corresponding motor-driven component. In conventional automated system, in general a space having a spherical volume with a radius of approximately 4 m is sufficient. If the space is selected considerably larger, there is a risk that too many motor-driven components are switched to a state of reduced risk potential although this is not required, so that the operation of the automated system is unnecessarily impaired.

The safety switching device is preferably provided with an actuating apparatus for switching the safety switching device into one of the control stages. In at least one second position of the actuating apparatus, the safety switching device assumes the second control stage and in a first position of the actuating apparatus it assumes the first control stage. One of the second positions defines an idle position of the actuating apparatus. An idle position here shall mean that the actuating apparatus assumes this position without external influence so that the safety switching device assumes the second control stage, thus switching off the motor-driven components. The actuating apparatus can only be switched from the second position to the first position by intentional switching, so that also the safety switching device is switched to the first control stage. Releasing the actuating apparatus, however, causes the safety switching device to switch again to the second control stage since the actuating apparatus in this case returns to the idle position and thus into the second position, resulting in the switching off of at least some of the motor-driven components.

According to a particularly preferred embodiment of the invention, the safety switching device comprises an interface for wireless data exchange, so that the user can easily carry the safety switching device without tripping over cables. In particular the position of the safety switching device is transmitted via the interface to a controller for the motor-driven components, so as to enable the motor-driven components to be switched to the corresponding operating state, particularly the reduced risk potential state, with the help of the controller.

In an advantageous embodiment of the invention, the apparatus for position determination comprises optical elements, which can be detected by a camera system. For example, the optical elements may be configured as reflectors, particularly as retroreflectors. The safety switching device, however, must be provided on the body of a user such that during any arbitrary movement of the person the optical elements can be detected with the help of a camera system in order to determine the position of the user inside the hazardous area. In addition, a complex camera system must be provided. As a result, the safety switching device can then, for example, not be held manually. Manual holding, however, is required, for example, particularly if the actuating apparatus of the safety switching device must be held actuated with the help of finger pressure in order to maintain the safety switching device in the first control stage, while the user is present in the hazardous area.

In an alternative advantageous embodiment of the invention, therefore the apparatus for position determination comprises a radio beacon, via which the position of the safety switching device inside the hazardous area can be precisely determined using simple means.

In a particularly preferred embodiment of the invention, the safety switching device can only be switched into the first control stage when the actuating apparatus has been displaced into the first position and is held there. In general, this can only be achieved if the corresponding person manually pushes the button. In this way it is ensured that the user consciously displaces the actuating apparatus into the first position and maintains it there as long as he is present in the hazardous area. Accidentally releasing the actuating apparatus causes the actuating apparatus to be moved back into the second position, thus switching the safety switching device into the second control stage, in which all motor-driven components are completely shut off.

With such a configuration of the safety switching device, however, it is not possible to perform work on one of the motor-driven components using both hands because in principle the actuating apparatus must be held depressed with one hand. Therefore, in an alternative embodiment of the invention, a sensor is provided, which is suited to determine the distance from the safety switching device to a user. For this purpose, for example sensors can be used that determine the distance to the skin of a person. Depending on the distance between the safety switching device and the user a signal can be emitted, which either ensures that only the components in the space are switched to a reduced risk potential state or, if the distance between the user and the safety switching device is too large and it can be assumed that the user has set the safety switching device aside, all motor-driven components in the hazardous area are completely switched off in order to prevent injury to the person.

In a particularly advantageous embodiment of the invention, the actuating apparatus of the safety switching device has two second positions in which the safety switching device can be switched to the second control stage. The safety switching device is thus configured as a three-stage switching device, wherein the first position is located between the two second positions and thus, upon release of the actuating apparatus, it is ensured on the one hand that the actuating apparatus is switched from the first position back into a second position, however wherein it is also ensured on the other hand that during a panic situation, in which the user becomes tense and presses the actuating apparatus with high force, the actuating apparatus is also switched to a second position, in which the motor-driven components are likewise switched off.

The method according to the invention for monitoring a hazardous area defined by motor-driven components comprises the following steps: The hazardous area is monitored for the entry of a user, wherein the user should carry a safety switching device upon entering the hazardous area. This device is preferably configured according to the invention. Entry into the hazardous area can be detected, for example, by passing light barriers or opening doors inside a safety fence surrounding the hazardous area. During entry, it is also possible to perform certain access control functions, which prevent unauthorized persons from entering the hazardous area. If a person enters the hazardous area, the position of the safety switching device inside the hazardous area is determined. In the event that the person does not carry a safety switching device, automatically all motor-driven components are completely switched off to ensure that the person is not injured by uncontrolled movements of the motor-driven components. At the same time, also the control stage of the safety switching device must be determined upon entry of the user in the hazardous area. If the safety switching device is in the second control stage, the motor-driven components are also switched off. However, if the user carries a safety switching device and the device is in a first control stage, a space around the safety switching device is determined, the space being at least large enough to allow the user to be present therein. Inside this space, the motor-driven components are switched to a state of reduced risk potential. If during the presence of the person inside the hazardous area at any arbitrary time the safety switching device switches from the first control stage to the second control stage, automatically all motor-driven components are switched off, because it is no longer guaranteed that the person is located in the space that was created around the safety switching device, and therefore a risk of injury could exist for the person.

It is preferable if the first control stage of the safety switching device is only switched when the user holds an actuating apparatus of the safety switching device in the actuated state. This guarantees that upon release of the actuating apparatus the safety switching device is switched to a second control stage, in which the motor-driven components inside the entire hazardous area are switched off.

Alternatively, the first control stage of the safety switching device is only switched when with the help of a sensor provided on the safety switching device the distance of the safety switching device to the user is determined and this distance is smaller than a predefined maximum distance. This maximum distance may not exceed several centimeters to ensure that the safety switching device is in the direct vicinity of the person. In this way it is enabled that the person can carry the switch in a bag and perform the appropriate maintenance work on the motor-driven components using both hands, while at the same time it is guaranteed that the person is located, with all body parts and at all times, in the space defined around the safety switching device and therefore not exposed to any risk of injury.

In an advantageous embodiment of the method, the first control stage is only switched if, with the help of an identification system, the user was identified as being authorized to access the area. In this way, it is guaranteed that no arbitrary users can gain access to hazardous areas with the help of a suitable safety switching device. In the identification system it may be stored which users have access to the hazardous area, optionally also to what parts of larger hazardous areas, wherein prior to the access to the hazardous area the identity of the user is determined and only then the corresponding safety switching device is released for switching into the first control stage. Thus, if an unauthorized user attempts to enter the hazardous area, the safety switching device cannot be switched into the first control stage, so that upon entry of the user in the hazardous area all motor-driven components are shut off.

The invention claimed is:

1. A safety switching device for a hazardous area defined by motor-driven components, the device being switchable into at least two control stages, wherein in a first control stage at least some of the motor-driven components can be switched into a state of reduced risk potential and in at least one second control stage at least some of the motor-driven components can be shut off, and wherein the safety switching device comprises an apparatus for determining the position of the safety switching device inside the hazardous area, characterized in that an actuating apparatus for switching the safety switching device into one of the control stages is provided, wherein the safety switching device in at least one second position of the actuating apparatus is in the second control stage and in a first position of the actuating apparatus is in the first control stage, one of the second positions being an idle position of the actuating apparatus, characterized in that the actuating apparatus has two second positions in which the safety switching device can be switched into the second control stage.

2. A method for monitoring a hazardous area defined by motor-driven components, comprising the following steps:

monitoring the hazardous area for the entry of a user, wherein the user should carry a safety switching device, which can be switched into a least two control stages, wherein in a first control stage at least some of the motor-driven components can be switched to a state of reduced risk potential and in at least one second control stage these components can be switched off;

determining the position of the safety switching device inside the hazardous area, shutting off the motor-driven components if the user carries no safety switching device or if the safety switching device is in a second control stage;

defining a space around the safety switching device, the space being at least large enough to allow the user to be present therein; and switching the motor-driven components disposed inside this space into a state of reduced risk potential, provided that the safety switching device is in a first control stage, characterized in that the first control stage of the safety switching device is only switched if the user holds an actuating apparatus of the safety switching device in the actuated state and, upon release of the actuating apparatus, the safety switching device is switched into a second control stage, in which the motor-driven components inside the entire hazardous area are shut off.

* * * * *